United States Patent [19]
Bowers et al.

[11] 3,834,479
[45] Sept. 10, 1974

[54] BATTERY HOLDDOWN

[75] Inventors: Bernard P. Bowers, Ontelaunee Township, Berks County; Delight E. Breidegam, Jr., Kutztown, both of Pa.

[73] Assignee: East Peru Manufacturing Company, Inc., Lyon Station, Pa.

[22] Filed: May 29, 1973

[21] Appl. No.: 364,624

[60] Continuation-in-part of Ser. No. 330,516, Feb. 8, 1973.

[52] U.S. Cl. ............................................. 180/68.5
[51] Int. Cl. ............................................. B60r 18/02
[58] Field of Search ....... 180/68.5; 248/361, DIG. 3

[56] References Cited
UNITED STATES PATENTS

| | | | |
|---|---|---|---|
| 1,458,280 | 6/1923 | Dooley | 180/68.5 |
| 1,469,595 | 10/1923 | Hick | 180/68.5 |
| 2,104,457 | 1/1938 | Galamb | 180/68.5 |
| 2,197,623 | 4/1940 | Smith et al. | 180/68.5 |
| 2,863,567 | 12/1958 | Friar | 248/DIG. 3 |
| 2,979,146 | 4/1961 | Fogle | 180/68.5 |
| 3,557,895 | 1/1971 | Thomas | 180/68.5 |

Primary Examiner—David Schonberg
Assistant Examiner—David M. Mitchell
Attorney, Agent, or Firm—Zachary T. Wobensmith, 2nd; Zachary T. Wobensmith, III

[57] ABSTRACT

A storage battery holddown is disclosed having a transverse bar with end holder brackets secured at each end, the end brackets having horizontal flanges for engagement with the battery case and vertical flanges extending downwardly along and close to opposite sides of the battery case. The vertical flanges have struck-out strips extending substantially their length for engagement by attaching or clamping devices. At one side of the battery the clamping device includes a clip for engagement with a vertical threaded bolt and at the other side a retaining bracket rod engaging in an opening in an interior wall portion of the vehicle and with a vertical flange and associated struck-out strip.

4 Claims, 4 Drawing Figures

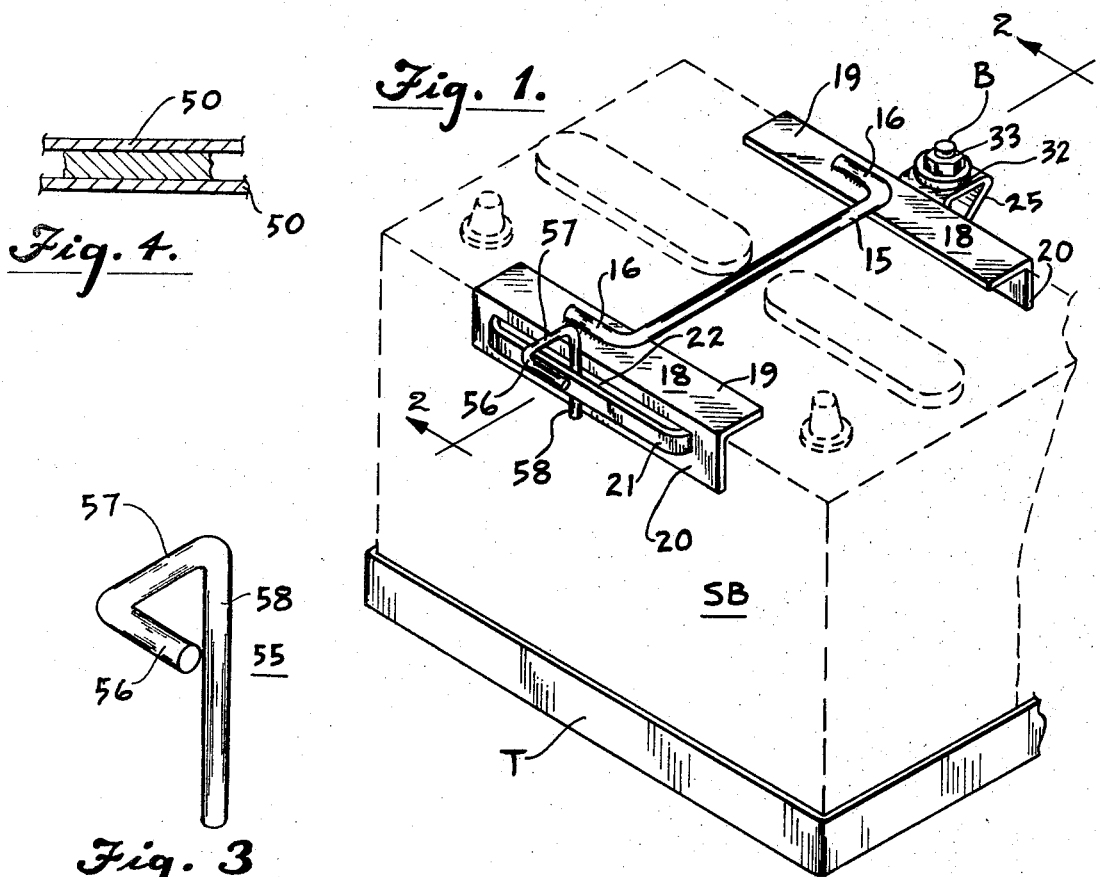
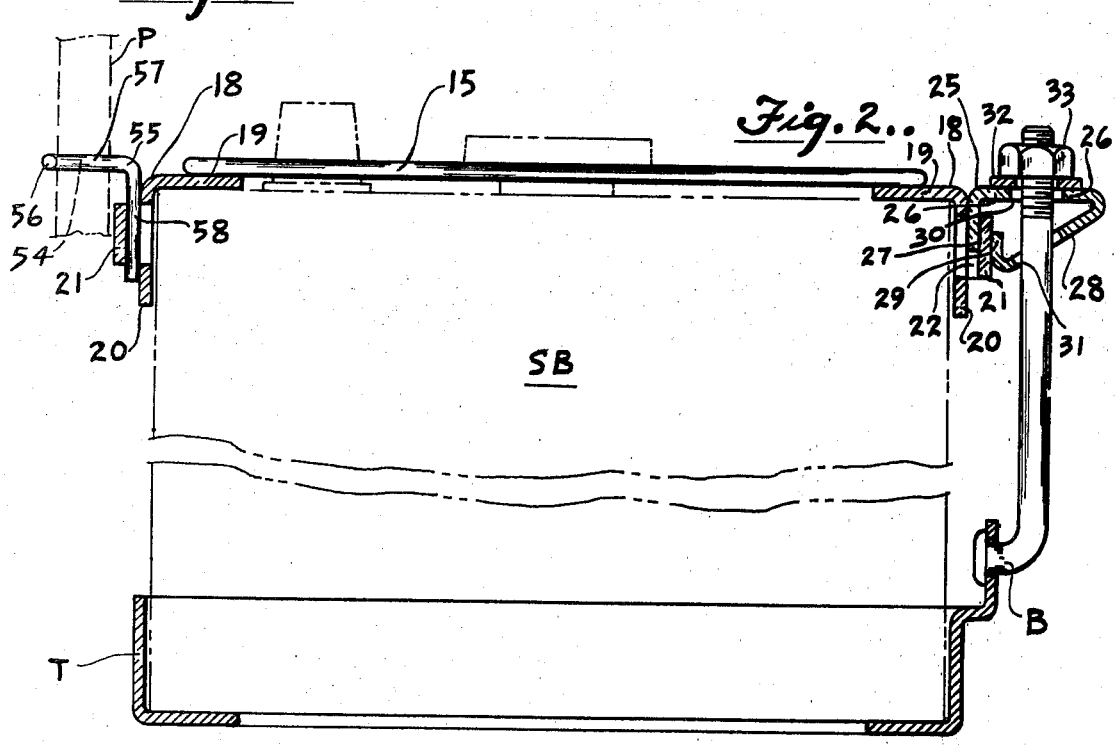

BATTERY HOLDDOWN

CROSS REFERENCE TO RELATED APPLICATIONS

This application is a continuation in part of prior application for patent for Battery Holddown filed Feb. 8, 1973, Ser. No. 330,516.

BACKGROUND OF THE INVENTION

1. Field of the Invention

This invention relates to holddown structure for storage batteries of motor vehicles.

2. Description of the Prior Art

Various types of battery holddown structures have heretofore been proposed.

The use of frames engaging the battery case is shown in the patents to Holman, U.S. Pat. No. 2,415,284, Hatfield, U.S. Pat. No. 2,514,056, and Buhl, U.S. Pat. No. 2,956,101. These devices lack adaptability to the many sizes and shapes of batteries now employed as well as the different provisions made by car manufacturers for receiving the battery.

It has also been proposed to use various types of clamps engaging the battery case. Examples are to be found in the patents to Hick, U.S. Pat. No. 1,636,562; Taylor, U.S. Pat. No. 1,772,847; Dunzweiler, U.S. Pat. No. 1,867,735; Greig, U.S. Pat. No. 2,196,578; Hildreth, U.S. Pat. No. 2,870,855; Hall, U.S. Pat. No. 2,944,395; Paller, U.S. Pat. No. 3,125,177; Brazell, U.S. Pat. No. 3,167,458; Grass, U.S. Pat. No. 3,254,736; Bauschard, U.S. Pat. No. 3,379,400; Hysmith, U.S. Pat. No. 3,498,400; and Bauschard, U.S. Pat. No. 3,581,837. While these structures were useful for specific batteries and battery receiving trays they were unsuited for many of the present requirements, particularly where only one side of the mounting employs a side tie rod.

It has also been proposed as in the patents to Merkle, U.S. Pat. No. 2,849,074, Bergman, U.S. Pat. No. 2,853,143; Anderson, U.S. Pat. No. 3,298,454, and Thomas, U.S. Pat. No. 3,557,895, to employ a central bar engaging the battery or its case and clamping the bar in position. The structures of Merkle, Bergman and Anderson are not suited for many types of batteries and battery receiving trays without structural modifications or adaptations to suit particular conditions. Thomas shows a structure which has adaptability to meet a number of the conditions presently encountered, but is unsuited for several current models of motor vehicles. The structure of Thomas, also, has a cross bar whose flanges extend upwardly to an undesired extent and this structure is difficult and unduly costly to construct.

In our prior application for patent heretofore referred to provision is made for accommodating a number of types of batteries in relation to their receiving trays, and the locations in the vehicle at which the battery is to be held. The structures there shown do not meet the requirements for retaining the battery on some vehicles, particularly batteries which are close to an interior wall or panel of certain models of vehicles.

The battery holddown of the present invention overcomes the shortcomings of the holddowns heretofore available, has an application to batteries and battery receiving trays of certain models of veicles and makes available a replacement kit which meets the needs of many users.

SUMMARY OF THE INVENTION

In accordance with the invention, a battery holddown is provided which includes a transverse bar having secured at each end, end holder brackets of angle or L-shape in cross section with horizontal portions to engage the top of the battery case and vertical portions to extend down the side of the battery case, the vertical portions each having substantially along its entire length a struck-out strip, one of the vertical portions and its associated struck-out strip having an attaching element, such as a clip or bracket for securement to a vertical clamp bolt, and the other vertical portion and its associated struck-out strip having a bracket rod in engagement therewith which bracket rod is engaged in an opening in an interior wall or panel portion of the vehicle.

It is the principal object of the invention to provide a battery retainer for holding down a battery which meets a specific need in certain models of automotive vehicles.

It is a further object of the invention to provide a battery retainer which can be packaged in a kit form with the kit containing a component adapted for the retention requirements for certain models of automotive vehicles.

It is a further object of the invention to provide a battery retainer of the character aforesaid which is simple in construction yet sturdy and reliable in operation.

Other objects and advantageous features of the invention will be apparent from the description and claims.

BRIEF DESCRIPTION OF THE DRAWINGS

The nature and characteristic features of the invention will be more readily understood from the following description taken in connection with the accompanying drawings forming part hereof, in which:

FIG. 1 is a view in perspective of a preferred embodiment of the invention;

FIG. 2 is a vertical sectional view taken approximately on the line 2—2 of FIG. 1;

FIG. 3 is a view in perspective of the bracket rod; and

FIG. 4 is a sectional view illustrating an enclosing coating used on certain components.

It should, of course, be understood that the description and drawings herein are illustrative merely and that various modifications and changes can be made in the structure disclosed without departing from the spirit of the invention.

Like numerals refer to like parts throughout the several views.

DESCRIPTION OF THE PREFERRED EMBODIMENT

Referring now more particularly to the drawings, a storage battery SB is shown, supported in a tray or frame T from which an upright bolt B extends in a well known manner.

The holddown structure shown, for use with an upright bolt B on one side and with a bracket bar 55 on the other side includes a cross rod or bar 15 having its ends 16 disposed in the same plane as the main portion of the bar 15. End holder brackets 18 are provided of angle or L-shape in cross section having inwardly extending horizontal flange portions 19 and vertical downwardly extending flange portions 20 with the ends 16 of the rod 15 welded or otherwise secured to the top and outer faces of the horizontal portions 19. The inner faces of the horizontal portions 19 of the end holder brackets 18 are adapted to engage the cover or top of the case of the battery SB with the inner faces of the vertical portions 20 engaged with or close to the opposite side walls of the case of the battery SB to prevent sidewise movement.

The side flange portions 20 are preferably provided, along substantially their entire lengths with struck-out strips 21 which provide between the strip 21 and the remainder of the side flange portions 20 horizontally elongated spaces 22 of predetermined transverse horizontal dimension for the reception of clamping elements to be described.

For clamping on one side a clip 25 is employed having a flat top portion 26 with a rear vertically extending rib 27 of a thickness in finished condition for reception in one of the spaces 22, and a downwardly inclined wall portion 28 with an upwardly extending vertical terminal rib 29 for engagement with the outer face of the strip 21. The clip 25 has an opening 30 in the flat top portion 26 and an axially aligned and larger opening 31 in the inclined wall 28 through which the bolt B extends. A washer 32 and nut 33 can be mounted on the upper end of the bolt B. Upon tightening of the nut 33, the force applied on the clip 25 urges it downwardly and transmits, from the clip 25, a downward holding force on the end holder bracket 18.

It will be noted that the clip 25 can be located as desired, along the end holder bracket 18 to accommodate different locations of the bolt B, with a wide range of adjustment available along the strip 21 and space 22 because of the length of the strip 21 and space 22.

In certain battery installations the battery SB is close to an interior vertical wall or panel P with an opening 54 therethrough. For this type of installation the bracket bar 55 is employed.

The bar 55, shown in detail in FIG. 3, has an end portion 56 for wall engagement, and, extending at right angles thereto and in the same plane, and, an intermediate portion 57 for wall penetration. The intermediate portion 57 has a holding portion 58 extending therefrom at right angles thereto and in a plane perpendicular to the plane in which the bar portions 56 and 57 are disposed. The holding portion 58 is insertable in the space 22 for frictional holding engagement with the interior of the strip 21 and the vertical flange 20.

The cross rod 15 and its end brackets 18, the clip 25, and the bracket bar 55 are preferably provided with a heavy enclosing coating 50 of any desired tough, adherent, corrosion resistant, waterproof, electrical resistant synthetic plastic to protect the same against battery acid, grease and oil and road dirt and to aid in providing a good frictional holding of the bracket bar 55.

A kit useful for motorists and repair men can be assembled and packaged to include a cross rod 15 and its end bracket 18, at least one clip 25, and a bracket bar 55 as well as other accessories, if desired.

We claim:

1. A battery holddown device for use in automotive vehicles having a wall adjacent the battery with a hole therein which comprises
    a cross rod,
    holder brackets of inverted L-shape in cross section with horizontal flanges having upper faces to which the ends of said cross rod are secured in fixed relation,
    said holder brackets having lower faces for engagement with a battery case,
    said holder brackets having integral vertical flanges extending downwardly from said horizontal flanges with inner faces for engagement with said battery case,
    each of said vertical flanges having an outer face with a strip therealong for the major portion of the length of the holder bracket offset outwardly from the outer face to provide a vertical space between the strip and the vertical flange, and
    members selectively positioned along and engaging each of said strips for holding said holder brackets in engagement with a battery case,
    one of said last mentioned members including a clip having a vertical portion extending into said space and a horizontal portion having an opening for the reception of a clamping bolt, and
    the other of said members comprising a bracket bar rod having a downwardly extending end portion received by said strip in said space, and a portion for penetration of said hole horizontally extending over said strip toward said wall.

2. A battery holddown device as defined in claim 1 in which
    said first mentioned end portion is in frictional engagement with said offset strip.

3. A battery holddown as defined in claim 1 in which
    said bracket bar rod end portion has said portion for wall penetration angularly disposed with respect thereto.

4. A battery holddown as defined in claim 3 in which
    said wall penetration portion has another end portion extending angularly therefrom for wall engagement.

* * * * *

UNITED STATES PATENT OFFICE
CERTIFICATE OF CORRECTION

Patent No. 3,834,479          Dated September 10, 1974

Inventor(s) Bernard P. Bowers, Delight E. Breidegam, Jr.

It is certified that error appears in the above-identified patent and that said Letters Patent are hereby corrected as shown below:

At "(73) Assignee:" the name of the assignee should be
- East Penn Manufacturing Company, Inc. -

Signed and sealed this 19th day of November 1974.

(SEAL)
Attest:

McCOY M. GIBSON JR.          C. MARSHALL DANN
Attesting Officer            Commissioner of Patents